July 7, 1931.  A. A. LENHART ET AL  1,813,500
TRACTOR HITCH
Filed Feb. 20, 1930
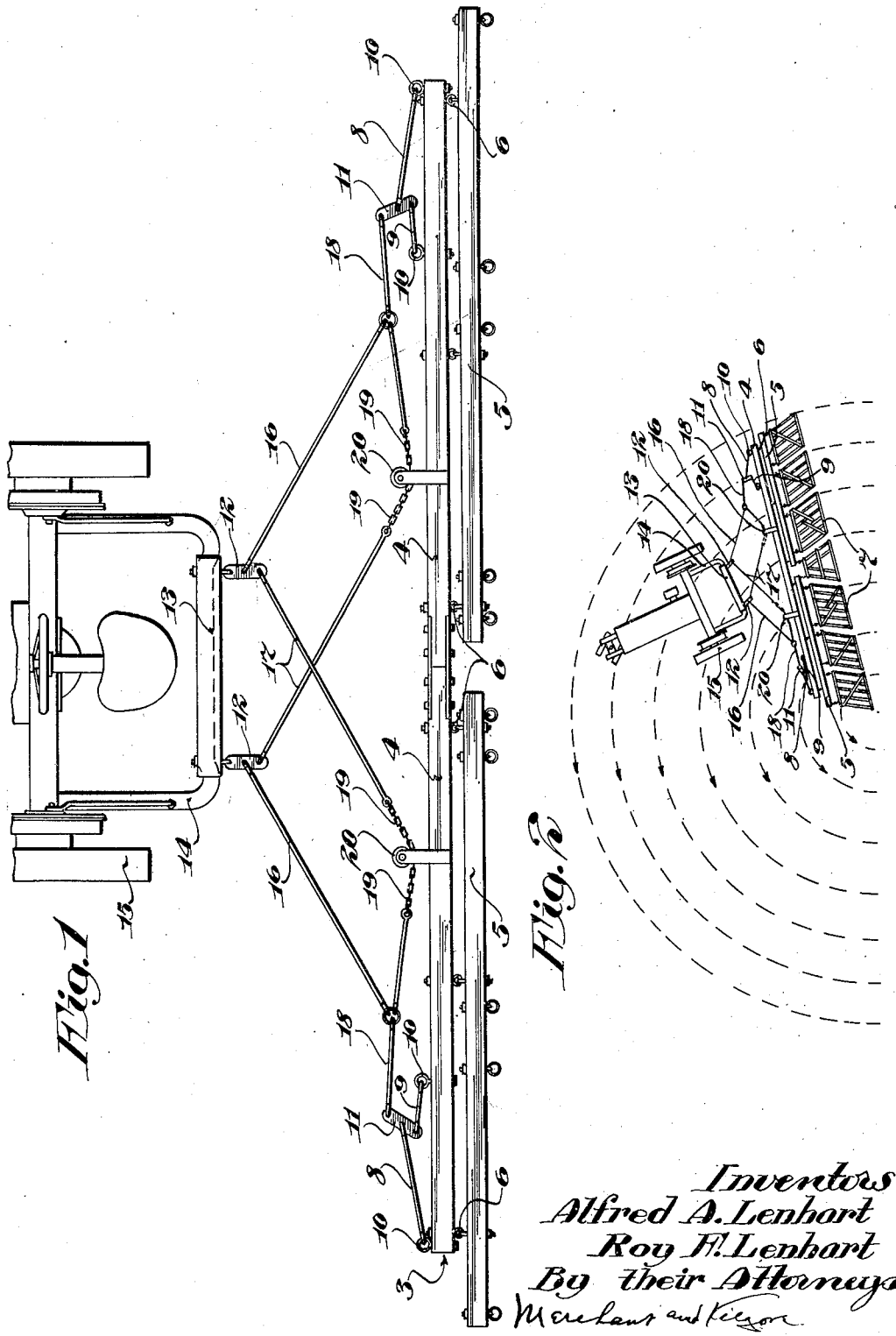
Inventors
Alfred A. Lenhart
Roy F. Lenhart
By their Attorneys Patented July 7, 1931

1,813,500

UNITED STATES PATENT OFFICE

ALFRED A. LENHART AND ROY F. LENHART, OF MINNEAPOLIS, MINNESOTA

TRACTOR HITCH

Application filed February 20, 1930. Serial No. 429,894.

Our present invention provides a simple and highly efficient tractor hitch intended for general use and has been especially designed for use in connecting a multiple section harrow to a tractor.

To the above end, generally stated, the invention consists of the novel devices and combinations of devices hereinafter described and defined in the claims.

The invention provides an automatic self-stabilizing tractor hitch that maintains a constant and uniform tension on all points of draft whether straight ahead, to the right or left or if the pulling power is greater on one portion of the evener. This stabilized tractor hitch automatically produces and maintains balanced draft at all times on the entire length of the evener, which is always straight, and holds the harrow sections attached thereto so that they will not skid or overlap. By the use of this harrow hitch it is possible to make a substantially perfect U-turn with a multiple section harrow at the end of a field due to the fact that the harrow sections are held so that the inner end thereof acts as a pivot around which the harrow swings in a semi-circle with the evener straight and the harrow sections in alignment. The equal distribution of strain on the entire length of the evener prevents the same from breaking and the overlapping or skidding of the harrow sections.

In the accompanying drawings, which illustrate the invention, like characters indicate like parts throughout the several views.

Referring to the drawings:

Fig. 1 is a plan view showing the hitch attached to the rear end of a tractor fragmentarily illustrated; and Fig. 2 diagrammatically illustrates the tractor making a U-turn with a sectional harrow connected to the evener.

The numeral 3 indicates an evener comprising a long drag beam 4 and two endwise spaced draw bars 5 flexibly connected to said beam at longitudinally spaced points by interlocked eye bolts 6. A multiple section harrow 7 is flexibly connected to the draw bars 5, as shown in Fig. 2.

At each end of the drag beam 4 is a pair of forwardly projecting converging links 8 and 9 the former or outer being relatively long and the latter or inner being relatively short. These links 8 and 9 at their inner or rear ends are flexibly connected by eye bolts 10 to the drag beam 4. The links 8 and 9 of each pair are loosely connected in opposing relation at their outer or front ends by a short forwardly projecting rear slack-compensating lever 11. These slack-compensating levers 11 are in forwardly converging relation and the links 8 are attached to the longitudinal centers thereof and links 9 are attached to the rear or inner ends of said levers.

The levers 11 at their front ends are connected by a linkage and a pair of front slack-compensating levers 12 to a transverse bar 13 which, in turn, is rigidly secured to the rear platform frame 14 of a tractor 15. These levers 12 are loosely attached to the bar 13 at points equi-distant from the transverse center of the tractor 15 and extend rearward therefrom. Said linkage includes a pair of outer links 16, in forwardly converging relation, and a pair of crossed inner links 17, the rear or inner ends of which are flexibly attached by short links 18 to the front or outer ends of the levers 11. The links 16 and 17, at their front or outer ends, are connected the former to the levers 12 intermediate of their ends, and the latter are connected to the rear ends of said levers.

The inner links 17 have short flexible intermediate sections 19 in the form of chains which run over guide sheaves 20 on the drag beam 4 and hold the rear end portions of the inner links 17 laterally offset from the outer links 16 and with the front end portions of the inner links 17 parallel to the links 16.

The links 8, 9, 16, 17 and 18 are preferably formed from stiff rods having at their ends coupling eyes and which links at all times act as tension members. It will be noted that the draft strain is distributed to the drag beam 4 at six different longitudinally spaced points. These connections are so arranged longitudinally of the beam 4 in a manner that will have the least tendency to bend said beam. The pulling strain on the levers 12 will be evenly distributed through the links 16, 17 and 18 to the levers 11. This pulling strain acting on the levers 11 keeps the links 8 and 9 under tension and automatically takes up slack therein and always keeps the same in a definite and predetermined relation to each other.

Fig. 2 diagrammatically illustrates a U-turn being made by the tractor 15 and shows the rear left hand corner of the harrow 7 substantially at the center of the turn where it remains as a pivot around which the harrow swings in a curve, as indicated by segmental broken lines.

From the above description it is evident that due to the fact that pull is exerted uniformly in opposite directions upon the links at all times during operation by the slack-compensating levers, entanglement of the parts is positively prevented, insuring proper functioning at all times of the parts in performing their duties in the organization to compensate for such momentary differences in draft as occur in the natural operation of the device. It is also evident that due to the action of the levers 12 on the links 16 and 17 and the opposed relation of the links connecting the drag beam and rear compensating levers, positive and rapid take-up and let-out of the links is affected in response to variances in draft on each side of the center of the draft beam.

This rapid take-up insures equalization under such conditions to keep the beam parallel to the front end of the harrow sections with the result that the sections are always kept in a definite parallel relation to each other and insure equal strain upon the drag beam.

What we claim is:

1. A tractor hitch comprising a drag beam, a pair of forwardly projecting slack-compensating levers, an outer link and an inner link attached to each end portion of the drag beam in opposing relation and connected the former to the intermediate portion of one of said levers and the latter to the inner end thereof, and an equalizing linkage connecting the levers to a tractor, said linkage comprising for each lever an inner member and an outer member connected at their inner ends to the outer end of the lever, means for attaching the outer ends of said members to a tractor at transversely offset points, and a guide for holding the inner end portion of one of said members laterally offset from the other thereof.

2. A tractor hitch comprising a drag beam, a pair of forwardly projecting slack-compensating levers, an outer link and an inner link attached to each end portion of the drag beam in opposing relation and connected the former to the intermediate portion of one of said levers and the latter to the inner end thereof, and an equalizing linkage connecting the levers to a tractor, said linkage comprising for each lever an inner member and an outer member connected at their inner ends to the outer end of the lever, means for attaching the outer ends of said members to a tractor at transversely offset points, one of the members of each pair having a flexible intermediate section, and guides on the drag beam for the flexible sections.

3. A tractor hitch comprising a drag beam, a pair of forwardly projecting slack-compensating levers, an outer link and an inner link attached to each end portion of the drag beam in opposing relation and connected the former to the intermediate portion of one of said levers and the latter to the inner end thereof, and an equalizing linkage connecting the levers to a tractor, said linkage comprising for each lever an inner member and an outer member connected at their inner ends to the outer end of the lever, means for attaching the outer ends of said members to a tractor at transversely offset points, and guides on the drag beam for holding the inner end portions of the inner members laterally offset from the outer members and with their outer end portions substantially parallel to the outer members.

4. The structure defined in claim 1 in which the tractor attaching means connects the inner member of one pair and the outer member of the other pair to substantially the same point.

5. A tractor hitch comprising a drag beam, a pair of forwardly projecting slack-compensating levers, an outer link and an inner link attached to each end portion of the drag beam in opposing relation and connected the former to the intermediate portion of one of said levers and the latter to the inner end thereof, and an equalizing linkage connecting the levers to a tractor, said linkage comprising a pair of forwardly projecting outer members the inner ends of which are connected to the outer ends of the levers, means for attaching the outer ends of the members to a tractor at transversely offset points, a pair of crossed members between said outer members, the inner ends of which are connected to the outer ends of the levers and the outer ends of which are connected to said tractor attaching means, and guides on the drag beam for holding the inner end portions of the crossed members laterally offset from said outer members.

6. A tractor hitch comprising a drag beam, a pair of forwardly projecting slack-compensating levers, an outer link and an inner link attached to each end portion of the drag beam in opposing relation and connected the former to the intermediate portion of one of said levers and the latter to the inner end thereof, and an equalizing linkage connecting the levers to a tractor, said linkage comprising a pair of forwardly projecting outer members, a pair of intermediate links connecting the inner ends of said members to the outer ends of the levers, means for attaching the outer ends of the outer members to a tractor at transversely offset points, a pair of crossed members between said outer members, the inner ends of which are connected to the intermediate links and the outer ends of which are connected to said tractor attaching means, said crossed members having flexible sections intermediate of their ends, and guides on the drag beam for said sections arranged to hold the outer end portions of the crossed members substantially parallel to said outer members.

7. The structure defined in claim 6 in which the intermediate link and the inner end portion of the crossed member for each lever are in opposing relation.

8. A tractor hitch comprising a drag beam, a pair of rear slack-compensating levers, a pair of links attached to each end portion of the drag beam in opposing relation and connected to said levers, a pair of front slack-compensating levers applicable to a tractor, and an equalizing linkage connecting the front and rear pairs of levers.

9. A tractor hitch comprising a drag beam, a rear pair of forwardly projecting slack-compensating levers, an outer link and an inner link attached to each end portion of the drag beam in opposing relation and connected the former to the intermediate portion of one of said levers and the latter to the inner end thereof, a front pair of rearwardly projecting slack-compensating levers and an equalizing linkage connecting the front and rear pairs of levers.

10. The structure defined in claim 9 in which said linkage comprises for each lever of the rear pair an inner member and an outer member connected at their inner ends to the outer end of said lever, the outer ends of said pair of members being attached one to each of the front levers.

11. The structure defined in claim 9 in which said linkage comprises a pair of forwardly projecting outer members the inner ends of which are connected to the outer ends of the rear pair of levers, the outer ends of the outer members being attached to the front pair of levers, a pair of crossed members between said outer members, the inner ends of which are connected to the outer ends of the rear pair of levers and the outer ends of which are connected to the front pair of levers at longitudinally spaced points from said outer members, and guides on the drag beam for holding the inner end portions of the crossed members laterally offset from said outer members.

In testimony whereof we affix our signatures.

ALFRED A. LENHART.
ROY F. LENHART.